Patented June 7, 1932

1,861,890

UNITED STATES PATENT OFFICE

EDUARD TSCHUNKUR AND ALBERT KLAMROTH, OF COLOGNE-MULHEIM, GERMANY, ASSIGNORS TO GENERAL ANILINE WORKS, INC., OF NEW YORK, N. Y., A CORPORATION OF DELAWARE

SEPARATION OF MIXTURES OF PRIMARY AROMATIC AMINES

No Drawing. Application filed December 16, 1929, Serial No. 414,565, and in Germany December 17, 1928.

The present invention relates to the manufacture of pure aromatic amines of the benzene or naphthalene series by the separation of mixtures of such amino compounds or such nuclear or nitrogen substitution products thereof, as are able to form salts with hydrohalic acids.

The new process consists in fractionally separating the pure hydrohalic acid salts of the aromatic amines contained in the mixture. These salts are obtained in good yields from the mixtures of the respective amino compounds by dissolving the mixture, if desired, in an indifferent organic solvent in which the hydrohalic acid salts of the aromatic amines are insoluble, such as benzene, toluene, chlorobenzene, o-dichlorobenzene, tetrahydronaphthalene, tetrachloromethane, trichloroethane, benzine and the like, and passing into the mixture or solution, while stirring, a slow current of dry hydrohalic acid gas, for example, hydrochloric acid gas. If no solvent is used and the aromatic bases are solid at normal temperature it will be necessary to heat the mixture until it becomes liquid previous to the introduction of the hydrohalic acid gas, so that the separating salt of the stronger base may be isolated from the remaining amines by filtering or centrifuging the mixture. Generally spoken it will be necessary that the amines are present in a liquefied state, no matter whether this is effected by heating them until they have fused, or by dissolving them in a solvent as mentioned above. The hydrohalic acid salts of the stronger bases separate first in a crystallized form, which usually can be readily filtered. The mixture of bases remaining is then further treated in the same manner until the individual basic components are separated successively according to their basicity in the form of their hydrohalic acid salts.

The new process may be demonstrated by the following experiment: When finely divided, dry crystals of p-xylidine hydrochloride are stirred for a prolonged time with a solution of a small excess of m-xylidine base in benzene and the crystals are then thoroughly filtered off by suction, it will be found that the crystals separated consist of m-xylidine hydrochloride. It is evident therefrom that a double decomposition of the p-xylidine hydrochloride with the m-xylidine base has occurred. The same applies also to other isomeric amines.

The invention is illustrated by the following examples without being restricted thereto:

Example 1

250 grams of crude xylidine (containing about 56% of the meta compound) are dissolved in about 750–1000 ccs. of benzene and into this solution is passed, while stirring, (temperature about 20° C.) a slow current of dry hydrochloric acid gas, such as is obtained, for example, in the chlorination of benzene. Somewhat more hydrochloric acid gas is provided than is required for the saturation of the m-xylidine present. The crystals formed are filtered with suction, washed with some benzene and dried. According to this method of working there are obtained from 250 grams of crude xylidine containing about 56% meta compound about 130 grams of crude m-xylidine, containing 95–98% of pure m-xylidine = 88–90% of the theoretical amount.

Further precipitation by means of hydrochloric acid gas yields a meta salt of somewhat lower meta compound content (80–90%), which is added to the subsequent charge of the crude material to be crystallized. The separation of pure m-xylidine in the form of the hydrochloride can thus be carried out in a comparatively simple and inexpensive manner. The o- and p-xylidines remaining in the mother liquors can be separated in the form of their hydrochloric acid salts in a similar manner by further treatment with hydrochloric acid gas and purified by recrystallization in the known manner.

Example 2

250 grams of an artificial mixture of equal parts of asymmetric m-xylidine (1.3-dimethyl-4-aminobenzene) and vic. m-xylidine (1.3-dimethyl-2-aminobenzene) are dissolved in 750 ccs. of benzene and a slow current of dry hydrochloric acid is passed into this solution, while stirring. The crystals formed are filtered off by suction, washed with some benzene and dried. The free base contains 96% of asymmetric m-xylidine. About 86% of the original asymmetric m-xylidine base is separated in the form of its hydrochloride in one operation.

*Example 3*

250 grams of crude o-xylidine (obtained from pure o-xylene) are dissolved in 1000 ccs. of benzene and a slow current of dry hydrochloric acid is passed into this solution, while stirring and cooling. The crystals formed are filtered off by suction, washed with some benzene and dried. The base set free from this salt contains about 90% of asymmetric o-xylidine (1.2-dimethyl-4-aminobenzene). The 1.2-dimethyl-3-aminobenzene can be separated from the mother liquor in the same manner by further treating it with hydrogen chloride gas.

*Example 4*

250 grams of crude toluidine are dissolved in 1000 ccs. of o-dichlorobenzene and a slow current of dry hydrochloric acid gas is passed into this solution, while stirring and cooling. The crystals formed are filtered off by suction, washed with some benzene and dried. The base set free from this salt contains 95% of p-toluidine. On further passing in the solution hydrochloric acid gas, an intermediate fraction rich in the para compound is precipitated. It may be added to the next crude portion to be treated. The remainder consists of o-toluidine, which can be isolated either as salt or as base in the known manner.

*Example 5*

Through a solution of a mixture of 75% of 6-chloro-2-amino-1-methylbenzene and 25% of 4-chloro-2-amino-1-methylbenzene in benzene a current of dry gaseous hydrochloric acid is passed until the increase of weight corresponds to 3/4 parts of the quantity of hydrochloric acid necessary for the complete neutralization. The separated hydrochloric acid salt is sucked off and washed with benzene. It is an almost absolutely pure hydrochloric acid salt of 6-chloro-2-amino-1-methylbenzene. From the filtrate the 4-chloro-2-amino-1-methylbenzene can be easily isolated in the known manner.

*Example 6*

250 grams of crude chloronaphthylamine are dissolved in about 1000 ccs. of benzene; through this solution a constant current of dry hydrochloric acid gas is introduced, while stirring, in such an amount that about 20% of the starting material are separated in form of a hydrochloric acid salt. The crystals thus formed are sucked off and washed with some benzene. They contain the largest part of the alpha-naphthylamine and 1.5-chloronaphthylamine of the crude chloronaphthylamine. The mother liquor contains 1.8-chloronaphthylamine in a good state of purity which can be isolated therefrom as a salt or base in the known manner.

The temperature and concentrations in the solvents specified in the above examples can be varied within wide limits.

The process can also be combined with other separation and purification processes in the sense hereinbefore described.

By this process not only isomeric amines but also other aromatic amino compounds can be separated from one another, the term "aromatic amino compound" being intended to include the unsubstituted aromatic amines as well as such aromatic amines as are substituted in the nucleus or at the nitrogen atom, for example by halogen atoms, hydroxy groups, alkyl groups, aryl groups, carboxylic acid groups or the like in such a manner that they are still able to form salts with hydrohalic acids.

Therefore, our new process represents a technically simple and cheap method of separating aromatic amines.

In the following claims, by the term "a liquefied mixture of primary amines . . ." are to be understood such compounds of the character described as are either liquid at normal temperatures or, if solid at normal temperatures, as are liquefied by the application of heat or by the addition of an indifferent organic solvent.

We claim:—

1. The new process which comprises passing a current of dry hydrochloric acid gas through a liquefied mixture of primary amines of the aromatic series which are capable of forming salts with hydrochloric acid, separating the precipitating hydrochloric acid salt of the stronger base, and further subjecting the mother liquor to the same treatment until the individual bases are separated successively according to their basicity.

2. The new process which comprises passing a current of dry hydrochloric acid gas through a liquefied mixture of primary amines of the naphthalene series which are capable of forming salts with hydrochloric acid, separating the precipitating hydrochloric acid salt of the stronger base, and further subjecting the mother liquor to the same treatment until the individual bases are separated successively according to their basicity.

3. The new process which comprises passing a current of dry hydrochloric acid through a solution of crude chloronaphthylamine in an indifferent organic solvent, separating the precipitating α-naphthylamine- and 1.5-chloro-naphthylamine hydrochloride, and further subjecting the mother liquor to the same treatment until the other bases are separated successively according to their basicity.

4. The new process which comprises passing a current of dry hydrochloric acid gas through a liquefied mixture of primary amines of the benzene series which are capable of forming salts with hydrochloric acid, separating the precipitating hydrochloric acid salt of the stronger base, and further subjecting the mother liquor to the same treatment until the individual bases are separated successively according to their basicity.

5. The new process which comprises passing a current of dry hydrochloric acid through a solution of crude xylidine in an indifferent organic solvent, separating the precipitating m-xylidine hydrochloride, and further subjecting the mother liquor to the same treatment until the individual bases are separated successively according to their basicity.

In testimony whereof, we affix our signatures.

EDUARD TSCHUNKUR.
ALBERT KLAMROTH.